Feb. 10, 1948. J. W. DAWSON 2,435,577
SPOT WELDING MECHANISM
Filed Feb. 1, 1943 3 Sheets-Sheet 2
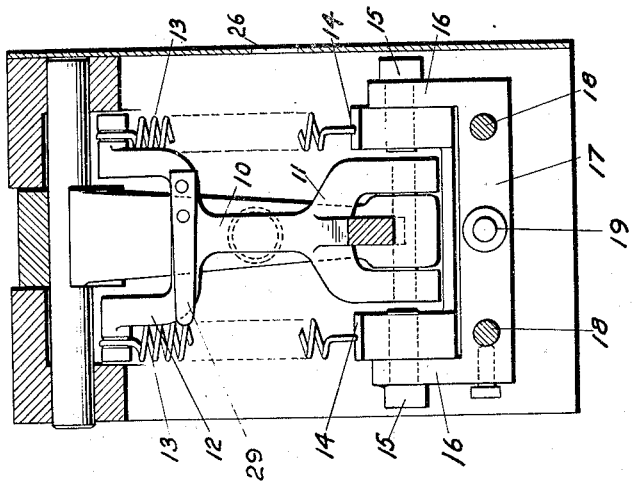
INVENTOR.
JOHN W. DAWSON,
BY Elmer J. Gorn
ATTY.

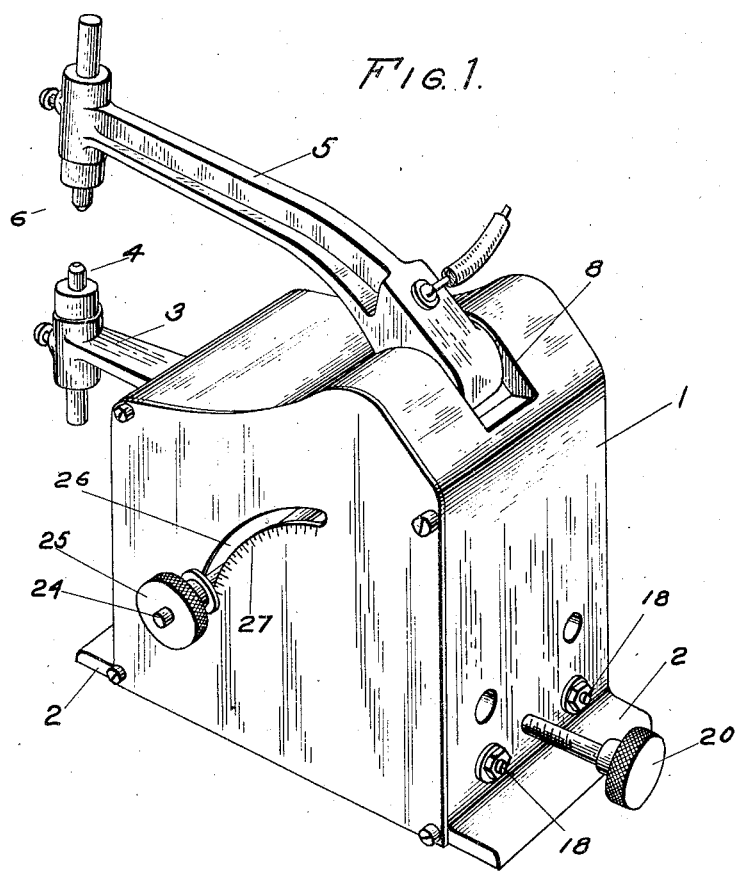

INVENTOR.
JOHN W. DAWSON,
BY Elmer J. Gorn
ATTY.

Patented Feb. 10, 1948

2,435,577

UNITED STATES PATENT OFFICE 2,435,577

SPOT-WELDING MECHANISM

John W. Dawson, West Newton, Mass., assignor to Raytheon Manufacturing Company, Newton, Mass., a corporation of Delaware Application February 1, 1943, Serial No. 474,390

15 Claims. (Cl. 219—4)

This invention relates to a mechanism for welding, particularly to resistance welding, and concerns the mechanism for moving a movable electrode into operative position adjacent a stationary electrode, and for applying sufficient force to clamp or hold the work under proper pressure between these electrodes.

In the present practice welding machines of the spot welding type employ mechanisms which require the transmission of considerable energy to the machine. For example, in manually operating welding machines for fabricating sheet metal parts the operator is required to move the outer end of a pedal type lever through a distance of about 10 inches. By stepping on this lever the operator cocks a large spring which in turn pulls the movable electrode into engagement with the work at a point opposite the stationary electrode. An automatic trip mechanism activates the welding timer when the spring has been stretched to the desired full position.

In some power operated welding mechanisms a motor-driven cam, or its equivalent, is commonly utilized to stretch or compress a spring for the purpose of applying the pressure. The motor, therefore, must be fairly large and draw a heavy line demand. In other power operated types, compressed air is used to move the electrode and apply the pressure. In such structures pistons of large diameter are required so that a safe air pressure of around sixty pounds will provide the necessary force on the electrode. Such arrangements, in which the pistons must move through a sufficient stroke to permit the electrode to span the work even though this work includes structural angles and the like, are inherently wasteful of energy.

It is among the objects of the present invention to provide a mechanism which will overcome the objections outlined above and which will require the expenditure of less energy in effecting the movement of the electrode to and from the work and in the application of the required pressure upon the work, regardless of whether the mechanism is to be operated manually or by some other source of power.

To this end a mechanism is provided in which the operations are divided into two fundamentally different classes. The first operation in which the movable electrode approaches the work requires movement through some distance, but without material opposing force. This portion of the operation is therefore effected without the expenditure of a material amount of energy except that required to overcome the friction of the system. The second operation which is effected after the electrode contacts the work involves the application of pressure without material travel. Accordingly, this operation also may be effected without the transfer or material loss of energy. Therefore, instead of building up anew the requisite force for applying the required pressure on the electrode in this second operation, I provide a predetermined potential force, such as, the force of a previously compressed or otherwise distorted spring. The application of the force of the spring to the electrode for each spot weld thus requires the expenditure of no more energy than is needed to swing the same into position.

A further objection to welding machines as at present constructed resides in the fact that the pressure brought to bear upon the work through the electrodes can be adjusted, if at all, only at great inconvenience to the operator. Furthermore, the degree of such adjustment is not satisfactory since usually adjustment through only a limited range of pressures is possible. In some machines only a few selected pressures are possible and no convenient means of selecting intermediate pressures is available. In such cases the only way in which the operator can secure the required pressure is by some undesirable expedient, such as, changing the relative position of the electrodes.

It is a further object of this invention to provide a welding mechanism which may be quickly adjusted to give any desired pressure upon the work up to a predetermined maximum value.

To this end it is a feature of the invention to provide a structure in which the force of a previously stressed spring is applied through the electrodes to the work in such a manner that its maximum component effective upon the work may be varied, from zero, to the full force at which the spring has been stressed.

The above and other objects and advantages of this invention will become apparent to those skilled in the art from a consideration of the following detailed description taken in conjunction with the accompanying drawings in which:

Fig. 1 shows a perspective view of a welding mechanism constructed in accordance with the present invention;

Fig. 2 shows a longitudinal section through the welding mechanism and its housing structure, parts being shown in side elevation;

Fig. 3 shows a transverse section taken on line 3—3 of Fig. 2;

Figure 4:
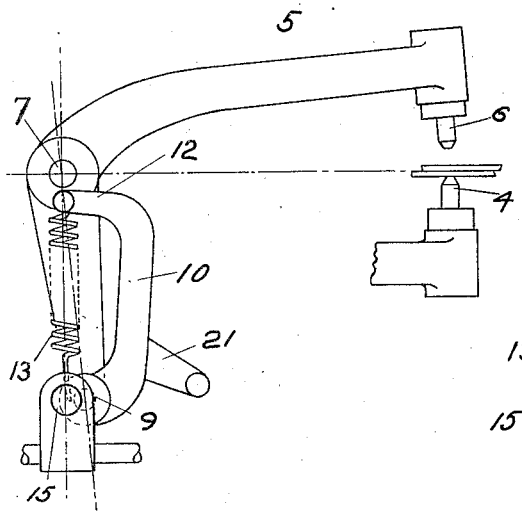
Fig. 4 is a diagrammatic view showing the mechanism in its normal or rest position with the electrodes open.

Referring to the drawings, in which like reference numerals refer to like parts throughout the various views, reference numeral 1 indicates a housing having suitable flanges 2 for mounting the same in any desired position. A bracket 3 is mounted on one end of the housing structure to provide a support for a stationary electrode 4. The bracket 3 is electrically insulated from the housing 1, in accordance with usual practice and also provided with suitable screw or other fastening means for attaching a cable connecting the electrode 4 with one of the outlets of a welding transformer. A lever 5 carrying a movable electrode 6 is pivoted at a point intermediate its length upon a pivot pin 7 which is provided adjacent a suitable opening 8 in the upper portion of the housing 5.

The free end of the lever 5 is provided with a pivot pin 9 upon which a link 10 is hinged by means of lower forked end 11. Link 10 is also provided with a second forked portion 12 at its upper end, and a pair of tension springs 13 is attached to the upper projecting ends of the forked portion 12. The opposite ends of tension springs 13 are attached to pivot blocks 14, which blocks are mounted upon a pair of pivot screws 15 positioned in the upwardly projecting arms 16 of a yoke 17. The yoke 17 is adjustably mounted upon guide rods 18 which extend longitudinally through the lower portion of the housing 1. An adjusting screw 19, having a knob 20 projecting externally of the housing, provides a suitable means for adjusting the yoke 17 longitudinally of the housing 1, and accordingly varying the position of the pivot screws 15 relative to the hinged joint, formed by pivot pin 9, between the lever 5 and the link 10.

A finger 21, which is preferably integral with, and projects outwardly and downwardly from the link 10, is provided with a perforation 22 for attaching a steel cable or link connection to a pedal lever or other source of power. A compression spring 23 acting between an end wall of the housing 1 and the lower arm of the lever 5 tends to maintain the lever 5 in its normal position with the electrodes separated. A stop rod 24 extends laterally through the housing 1 and is provided with a knurled screw-head 25 externally of the housing for holding the stop rod in any adjusted position within an arcuate slot 26 formed in a side wall of the housing 1. The stop rod 24 thus projects into the path of movement of the link 10, to limit the outward swing of this link from the lever 5 to any desired extent within the range of substantially 90° permitted by the slot 26. A calibrated scale 27 may be provided along the edge of the slot 26 so that the pressure conditions for any particular type of work may be repeated once a desired setting has been determined.

Figure 5:
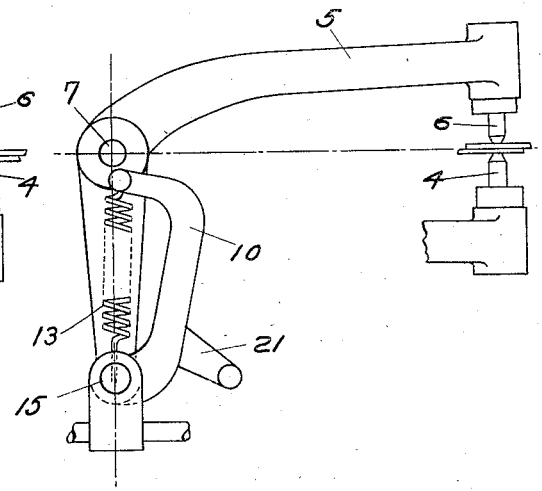
Fig. 5 is a view similar to Fig. 4 but showing the parts in an intermediate position with the electrodes in contact with the work but before a material pressure has been applied thereto.
Figure 6:
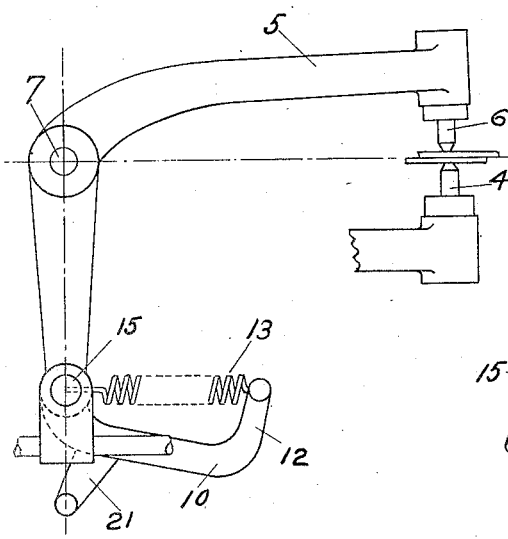
Fig. 6 is a further diagrammatic view showing the parts in full welding position with a predetermined pressure applied through the electrodes to the work.

In the operation in the form of the device described above when the parts are in the position shown in Fig. 4, which will hereafter be called the normal or open position, a slight downward pull on the cable attached to the finger 21 will swing the lever 5 on its pivot pin 7 in a clockwise direction to the position shown in Fig. 5 which will hereafter be called the intermediate or the closed non-pressure position. In this last mentioned position the movable electrode 6 contacts the work at a point opposite the stationary electrode 4 without exerting material pressure thereon. During this portion of the operation in which the lever 5 moves from the position shown in Fig. 4 to that shown in Fig. 5, there is no relative motion between the lever 5 and the link 10. This latter merely swings with interior arm of the lever 5 as if fixed thereto at each end. This is because a small component of the springs 13 acts in a direction to maintain the upper forked end 12 of the link 10 in abutment with the lever 5 until the pivot pin 9 has moved into axial alignment with the pivot screws 15 toward the end of this portion of the operation. By the end of this portion of the operation the parts will be in the position shown in Fig. 5 with the movable electrode having moved into contact with the work. The lever 5 will no longer move freely in response to a slight pull on the cable end of finger 21, but will be substantially immovable except for a slight bending upon the application of further force. The link 10 will now swing in a clockwise direction on the pivot pin 9. If this pivot pin is in perfect alignment with the pivot screws 15 then it will be seen that the end of the link 10 attached to springs 13 will move through the arc of a circle having the same radius and centered upon the same axis as that through which the springs 13 swing on the pivot screws 15. Accordingly, further pull on the finger 21 will swing the link 10 outwardly to a position such as shown in Fig. 6, and this movement can be accomplished without varying the tension of the springs 13 and without the necessity of overcoming any material force other than that required to overcome the friction of swinging the link upon its pivot pin and of swinging the springs upon their pivot screws.

Up to the moment when the link 10 swings outwardly the force of the springs 13, which on assembly were placed under tension, has been applied in a direction which is substantially longitudinal of the interior arm of the lever 5. Thus at first no force is applied in a direction tending to turn this lever, but as the link 10 turns in a clockwise direction an increasing component of the force of the springs 13 is applied at pivot pin 9 in a direction to force the movable electrode against the work. Thus after the link 10 has moved through an arc of substantially 90°, from its position shown in Fig. 5 to the position shown in Fig. 6, the full force of the springs is applied in a direction which is substantially tangential to the arc of the circle described by the pivot 9. Under these conditions the force of the springs is applied in a direction to supply a maximum pressure upon the work. At any angle less than 90° a lesser component of the force of the springs is effective in a tangential direction, while the remaining component of the force may be considered as acting in a radial direction. Accordingly, by altering the position of the stop rod 24 any desired force within the range of the springs, that is to say within the range of the tension at which the springs have been set, may be applied. This ability to alter the force applied to the work without altering the initial tension setting of the springs 13 is important where the machine is to be used on different kinds of work, such as, upon sheets of different form or thickness. By means of a graduated scale 27 on the edge of the slot 26 the most favorable position of the stop rod for any particular piece of work may be noted and the conditions duplicated for subsequent work.

A timer switch 28 may be mounted upon the stop rod 24 in such a position as to be contacted by the link 10, or some contact element such as 29 connected thereto, so that the flow of welding current to the welding electrodes is initiated automatically upon the full application of the desired pressure to the work.

It will be understood that the welding circuit controlled by timer switch 28 may be of any well known type such for example as that shown in my prior U. S. Patent 2,278,430, or in numerous others, and that when so used the timer switch 28 takes the place of the usual manually operated push button controlling the welding circuit. Of course the timer switch may be omitted in which case the welding circuit may be closed by the operator after the link 10 has contacted the stop rod 24.

Although but a single embodiment of the invention has been described herein and shown in the accompanying drawings, it will be obvious to those skilled in the art that many other embodiments and variations of the device may be made in accordance with the teachings thereof and within the scope of the appended claims.

Figure 7:
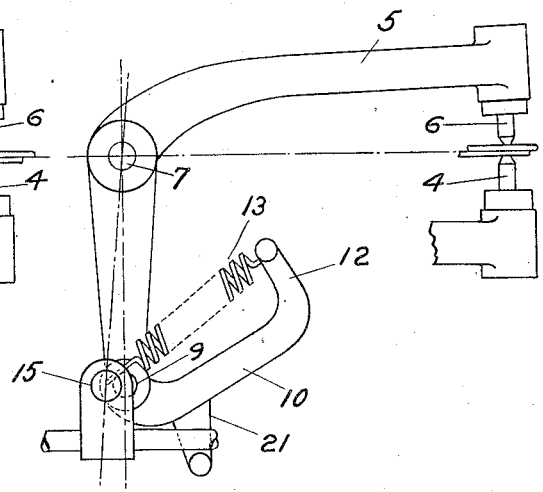
Fig. 7 is a view corresponding to Fig. 6, but with certain parts set in a slightly different position to which they are readily adjustable.

For the sake of simplicity in describing the invention, the operation has been set forth with reference to the simplest case in which the axes of rotation of the springs 13 and the links 10 coincide during the final or pressure applying operation of the device. In this particular case it will be obvious that the springs 13 will not expand or contract during this portion of the operation, except to the slight extent required by the distortion of the lever 5, or by the compression of the work between the electrodes. It will be observed, however, that this simple relationship is not essential to the efficient operation of the device; that is to say, if the pivot pins 9 and the pivot screws 15 of the springs do not exactly coincide then there will be a slight variation in the tension of the springs during the period in which the link 10 is swinging outwardly from the lever. For example, if the pivot pin 9, which forms the center of rotation for the link 10, is somewhat to the right of the position shown in Fig. 6 during this part of the operation then the tension of the springs 13 will be increased to an extent depending upon the vector distance between the centers 9 and 15 in the direction of the point of attachment of the springs 13 at the upper forked ends of the link 10. Such slight difference in the ultimate tension of the springs 13 makes little difference in the operation of the device. The relative distance between the centers 9 and 15 during the final portion of the operation may be varied, as desired, to suit the character of the work by shifting the pivot screws 15 to the right or to the left of the position shown in Fig. 2. This adjustment of pivot screws 15 is effected by shifting the yoke 17, on which they are mounted, to the right or the left by means of the knob 20 of adjusting screw 19. It will be understood that unless the pivot 9 is to the right of pivot 15 and below a line drawn between the pivot 15 and the point of attachment of springs 13 to the upper forked end of the link 10, there will be no force available to return the link 10 to its normal position against the interior arm of the lever 5. It is therefore preferred that the parts be positioned so that a small component of the force of the springs 13 will be effective to bias the link 10 in the direction of the lever 5. This position is illustrated diagrammatically in Fig. 7, from which it will be seen that a very small component of the force of springs 13 is effective to bias the link 10 toward its normal position against the lever 5, while the major component is effective to bias the lever 5 in a direction to apply pressure to the work. Obviously instead of using a small component of the force of springs 13 a separate spring could be used to bias the link 10 toward its normal position.

What is claimed is:

1. In a welding machine of the type having a fixed electrode and a movable electrode, means to move said movable electrode into contact with the work, means effective after such contact to apply a previously fixed force to said movable electrode, and means to limit the application of said fixed force to a predetermined component thereof to predetermine the pressure upon the work.

2. In a welding machine of the type having a fixed electrode and a movable electrode, mechanism for operating said movable electrode including means to move said movable electrode into contact with the work, a prestressed spring normally acting in such a direction that only a small component of its force is effective upon said movable electrode, and means, effective after said contact, to swing said spring in a direction to place an increasing component of its force upon said electrode and thereby apply pressure upon the work.

3. In a welding machine of the type having a fixed electrode and a movable electrode, mechanism for operating said movable electrode comprising a pivoted lever, means to actuate said lever to move said movable electrode into contact with the work, a prestressed spring normally acting upon said lever in such a direction that only a small component of its force is effective to move the same, and means, effective after said contact, to swing said spring in a direction to place an increasing component of its force upon said lever and thereby apply pressure upon the work.

4. In a welding machine of the type having a fixed electrode and a movable electrode, mechanism for operating said movable electrode comprising a pivoted lever, means to actuate said lever to move said movable electrode into contact with the work, means effective after said contact to apply the force of a previously stressed resilient member to said movable electrode in a direction to place a predetermined pressure upon the work, and an adjustable stop member to limit the degree of pressure upon the work by limiting the angle at which the force of said resilient member is applied without materially altering the original stress of said member.

5. In a welding machine of the type having a fixed electrode and a movable electrode, mechanism for operating said movable electrode comprising a pivoted lever, means to actuate said lever to move said movable electrode into contact with the work, a prestressed spring normally acting upon said lever in such a direction that only a small component of its force is effective to move the same, means effective after said contact to swing said spring in a direction to place an increasing component of its force upon said lever in a direction to apply pressure upon the work, and an adjustable stop member to limit the degree of pressure upon the work by limiting the angle at which said spring may act upon said lever.

6. In a welding machine of the type having a fixed electrode and a movable electrode, mechanism for operating said movable electrode comprising a pivoted lever, means to actuate said lever to move said movable electrode into contact with the work, a resilient member normally held under a predetermined stress, and means effective after said contact, to apply the force of said previously stressed resilient member to said movable electrode in a direction to place a predetermined pressure upon the work without materially altering the normal stress of said member.

7. In a welding machine of the type having a fixed electrode, a movable electrode and a supporting structure therefor, mechanism for operating said movable electrode comprising a pivoted lever, means to actuate said lever to move said movable electrode into contact with the work, a link having one end hinged to said lever, a prestressed spring having one end attached to said supporting structure and its other end attached to the free end of said link and only a small component of its force normally effective to move the same, and means effective after said contact to swing said link upon said hinge without substantially altering the stress of said spring and thereby place an increasing component of the force of said spring upon said lever in a direction to apply pressure upon the work.

8. In a welding machine of the type having a fixed electrode and a movable electrode, mechanism for operating said movable electrode comprising a pivoted lever, means to actuate said lever to move said movable electrode into contact with the work, a link having a hinged connection to said lever, a prestressed spring normally acting through said link upon said lever in such a direction that only a small component of its force is effective in a direction tending to move the same, and means effective after contact of said movable electrode with the work to swing said link upon said hinged connection and thereby apply a continuously increasing component of the force of said spring through said lever and to said electrode in a direction to place a pressure upon the work.

9. In a welding machine of the type having a fixed electrode, a movable electrode and a supporting structure therefor, mechanism for operating said movable electrode comprising an electrode lever pivoted intermediate its ends, said movable electrode being mounted at one end of said lever, a link hinged at the opposite end of said lever, said link normally extending in the general direction of the pivot point of said lever, normally stressed resilient means connected between the free end of said link and a point on the supporting structure adjacent said hinged connection between said link and said lever, means connected to said link to first swing said electrode lever into contact with the work and thereafter swing said link outwardly from said lever, to thereby apply force from said resilient means through said link to the hinged end of said electrode lever.

10. In a welding machine of the type having a fixed electrode, and a movable electrode, mechanism for operating said movable electrode comprising a pivoted lever, means to actuate said lever to move said movable electrode into contact with the work, a link having a hinged connection to said lever, a prestressed spring normally acting through said link upon said lever in such a direction that only a small component of its force is effective in a direction tending to move the same, means effective after said contact to swing said link upon said hinged connection and thereby apply a continuously increasing component of the force of said spring through said lever and to said electrode in a direction to place a pressure upon the work, a stop member, and means to adjustably position said stop member in the path of movement of said link to limit the angle through which said link may swing upon said hinged connection and accordingly limit the angle at which the stress of said spring is applied to said lever.

11. In a welding machine of the type having a fixed electrode, and a movable electrode, mechanism for operating said movable electrode comprising a pivoted lever, means to actuate said lever to move said movable electrode into contact with the work, a link having a hinged connection to said lever, a prestressed spring normally acting through said link upon said lever in such a direction that only a small component of its force is effective in a direction tending to move the same, means effective after said contact to swing said link upon said hinged connection and thereby apply a continuously increasing component of the force of said spring through said lever and to said electrode in a direction to place a pressure upon the work, means to limit the angle through which said link may swing upon said hinged connection and accordingly limit the angle at which the stress of said spring is applied to said lever, and a switch operable by said link at the limit of its swing to control the welding circuit supplying current to said electrodes.

12. In a welding machine of the type having a supporting structure, a fixed electrode, and a movable electrode, mechanism for operating said movable electrode comprising an electrode lever pivoted intermediate its ends, said movable electrode being mounted at one end of said lever, a link hinged at the opposite end of said lever, said link normally extending in the general direction of the pivot point of said electrode lever, normally stressed resilient means connected between the free end of said link and a point on the supporting structure adjacent said hinged connection between said link and said lever, means connected to said link to first swing said electrode lever into contact with the work and thereafter swing said link outwardly from said lever to thereby apply force from said resilient means through said link to the hinged end of said electrode lever, a stop member, and means to adjustably position said stop member in the path of movement of said link to limit the angle through which said link may swing upon said hinged connection and accordingly limit the angle at which the stress of said spring is applied to said lever.

13. In a welding machine of the type having a supporting structure, a fixed electrode, and a movable electrode, mechanism for operating said movable electrode comprising an electrode lever pivoted intermediate its ends, said movable electrode being mounted at one end of said lever, a link hinged at the opposite end of said lever, said link normally extending in the general direction of the pivot point of said electrode lever, normally stressed resilient means connected between the free end of said link and a point on the supporting structure adjacent said hinged connection between said link and said lever, means connected to said link to first swing said electrode lever into contact with the work and thereafter swing said link outwardly from said lever to thereby apply force from said resilient means through said link to the hinged end of said electrode lever, a stop member, means to adjustably position said stop member in the path of movement of said link to limit the angle through which said link may swing upon said hinged connection and accordingly limit the angle at which the stress of said spring is applied to said lever, and a switch operable by said link at the limit of its swing to control the welding circuit supplying current to said electrodes.

14. In a welding machine, a pair of relatively movable electrodes, means to move said electrodes into contact with the work, means effective after such contact to exert a previously generated force through said electrodes thereby placing a pressure upon the work, and means to relieve said pressure without material expenditure of said force.

15. In a welding machine, a pair of relatively movable electrodes, means to move said electrodes into contact with the work, means effective after such contact to exert a previously generated force through said electrodes thereby placing a pressure upon the work, means to relieve said pressure without material expenditure of said force, and means for adjusting the magnitude of said pressure by altering the direction in which said force is applied.

JOHN W. DAWSON.

REFERENCES CITED

The following references are of record in the file of this patent:

UNITED STATES PATENTS

| Number | Name | Date |
| --- | --- | --- |
| 1,579,721 | Leslie | Apr. 6, 1926 |
| 1,728,616 | Kondakjian | Sept. 17, 1929 |
| 1,869,188 | Eckman | July 26, 1932 |
| 1,996,679 | Lepek | Apr. 2, 1935 |
| 2,251,957 | Rainville | Aug. 12, 1941 |
| 1,698,656 | Ream | Jan. 8, 1929 |
| 1,813,801 | Haynes | July 7, 1931 |

FOREIGN PATENTS

| Number | Country | Date |
| --- | --- | --- |
| 430,768 | Great Britain | June 25, 1935 |